(12) United States Patent
Masutomi

(10) Patent No.: US 11,012,547 B2
(45) Date of Patent: May 18, 2021

(54) ELECTRONIC DEVICE

(71) Applicant: SHARP KABUSHIKI KAISHA, Sakai (JP)

(72) Inventor: Yuta Masutomi, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 16/671,600

(22) Filed: Nov. 1, 2019

(65) Prior Publication Data
US 2020/0145521 A1 May 7, 2020

(30) Foreign Application Priority Data

Nov. 6, 2018 (JP) .............................. JP2018-208818

(51) Int. Cl.
H05K 5/00 (2006.01)
G02F 1/1333 (2006.01)
H04M 1/02 (2006.01)

(52) U.S. Cl.
CPC ........ *H04M 1/0266* (2013.01); *G02F 1/1333* (2013.01); *H04M 1/0249* (2013.01); *H05K 5/0017* (2013.01)

(58) Field of Classification Search
CPC .................................................... H05K 5/0017
See application file for complete search history.

(56) References Cited

U.S. PATENT DOCUMENTS

2014/0133073 A1* 5/2014 Ahn .................. G02F 1/133308
361/679.01

FOREIGN PATENT DOCUMENTS

CN 207481346 U * 6/2018
JP 2010-114624 A 5/2010

* cited by examiner

Primary Examiner — Jerry Wu
(74) Attorney, Agent, or Firm — ScienBiziP, P.C.

(57) ABSTRACT

An electronic device includes a first adhesive sheet affixed to a back surface of a display panel, and a second adhesive sheet affixed to the first adhesive sheet and to a housing. A first adhesion of the first adhesive sheet to the display panel is weaker than a second adhesion of the second adhesive sheet to the housing.

6 Claims, 16 Drawing Sheets

ELECTRONIC DEVICE

BACKGROUND

1. Field

The present disclosure relates to an electronic device.

2. Description of the Related Art

Various methods for attaching a display panel to the inside of a housing of an electronic device have been examined.

Japanese Unexamined Patent Application Publication No. 2010-114624 describes a display panel that is attached to a frame-shaped holder, and the display panel is attached to a housing via the holder. FIG. 17 illustrates an electronic device 207 in which a display panel 210 is attached to a housing 220 by using a frame-shaped holder 240. The display panel 210 includes a panel portion 212 and a reflection film 211 that is affixed to a back surface of the panel portion 212. The reflection film 211 and the holder 240 are affixed to each other via an adhesive tape 230 that has adhesion on both surfaces thereof. However, it is difficult to reduce the size and thickness of the electronic device 207, because the thickness of the electronic device 207 is increased by the thickness of the holder 240.

FIG. 18A illustrates an electronic device 208 in which a reflection film 211 of a display panel 210 and a housing 220 are directly affixed to each other via an adhesive tape 230, without using a holder. It is possible to reduce the size and thickness of the electronic device 208, because a holder for attaching the display panel 210 to the housing 220 is not used.

As illustrated in FIG. 18A, the electronic device 208 has a structure such that the display panel 210 is directly affixed to the housing 220 via the adhesive tape 230. Therefore, as illustrated in FIG. 18B, when a panel portion 212 is lifted by a finger 250 or the like in order to reuse the display panel 210, the panel portion 212 and the reflection film 211 may become separated from each other. In this case, it is not possible to reuse the display panel 210.

It is desirable to provide an electronic device that allows a display panel to be easily reused.

SUMMARY

According to an aspect of the disclosure, there is provided an electronic device including a housing, a display panel attached to an inner surface of the housing, a first adhesive sheet affixed to a back surface of the display panel, and a second adhesive sheet affixed to the first adhesive sheet and to the housing. A first adhesion of the first adhesive sheet to the display panel is weaker than a second adhesion of the second adhesive sheet to the housing.

Advantageous Effects of Invention

An aspect of the disclosure advantageously provides an electronic device that allows a display panel to be easily reused.

DESCRIPTION OF THE EMBODIMENTS

First Embodiment

The present disclosure is applicable, for example, to electronic devices such as a smartphone (described below as an example), a foldable mobile phone, a wearable terminal, a small game machine, and a tablet terminal. In other words, the present disclosure is applicable to any electronic device that includes a display panel.

Structure of Electronic Device

Figure 1A:
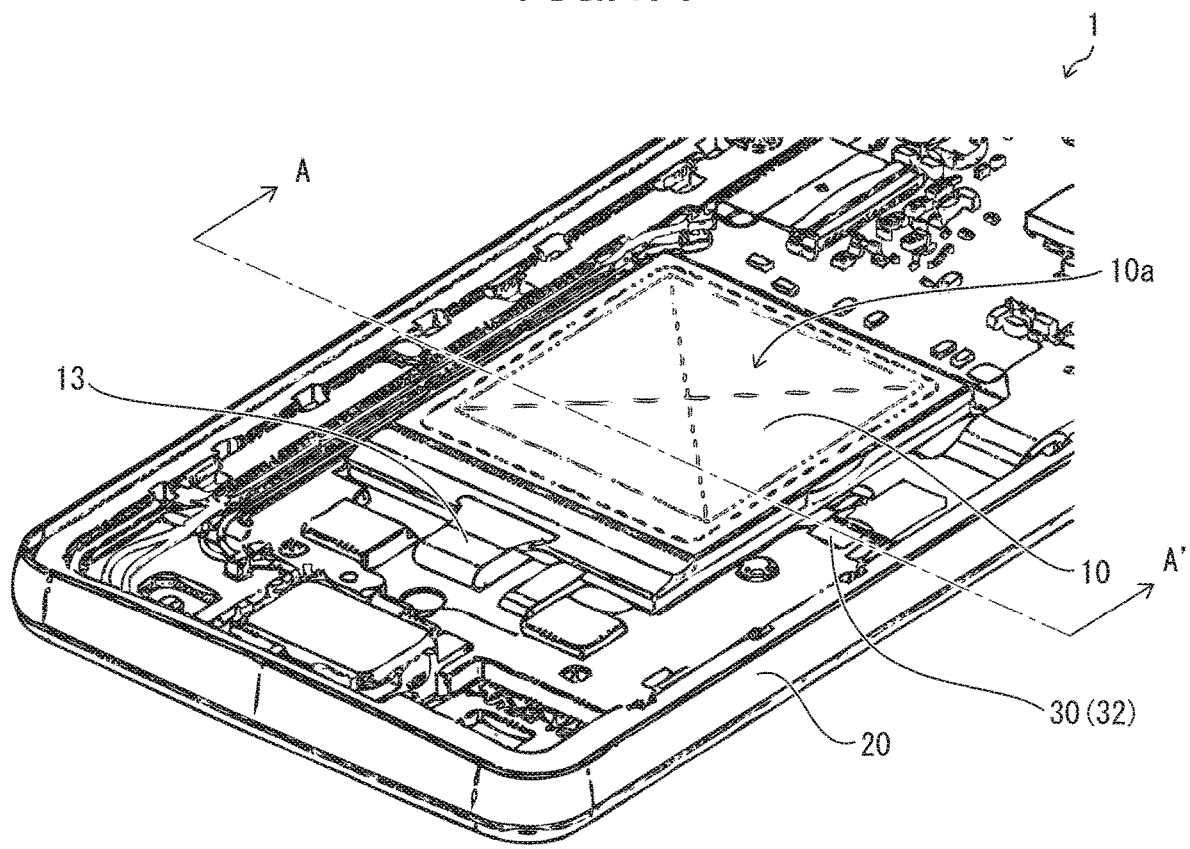
FIG. 1A is a perspective view illustrating the internal structure of an electronic device according to a first embodiment.
Figure 1B:
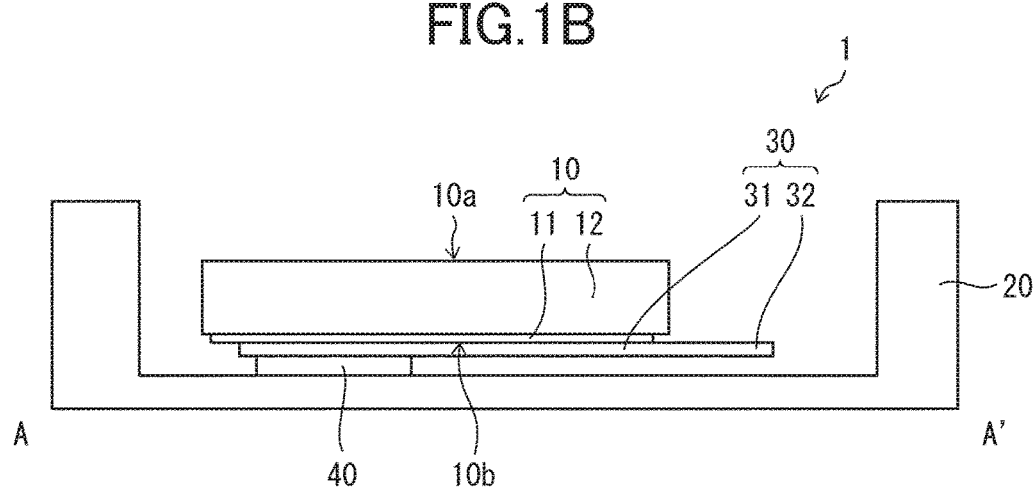
FIG. 1B is a sectional view taken along line A-A' in FIG. 1A.

FIG. 1A is a perspective view illustrating the internal structure of an electronic device 1 according to a first embodiment. FIG. 1B is a sectional view taken along line A-A' in FIG. 1A. The electronic device 1 includes a display panel 10, a first adhesive sheet 30, a second adhesive sheet 40, and a housing 20.

The housing 20 is a case that covers various components in the electronic device 1. For example, the housing 20 may be made of a resin or a metal. In the electronic device 1, the display panel 10 is attached to an inner surface of the housing 20 via the first adhesive sheet 30 and the second adhesive sheet 40.

The display panel 10 is not particularly limited, as long as the display panel 10 can display an image. It is possible to use various display panels, such as a liquid crystal panel (LCD) and an organic electroluminescent (EL) panel having an organic electroluminescent diode (OLED) as an electro-optical device. For example, the display panel 10 is a liquid crystal panel.

Various films are affixed to outer surfaces of the display panel 10. In the present embodiment, a reflection film (film) 11 is affixed to a back surface of a panel portion 12 of the display panel 10. For example, the reflection film 11 is a film that reflects light emitted from a backlight of the panel portion 12 toward a display surface 10a. The display panel 10 has the display surface (front surface) 10a, which includes an image display region, and a back surface 10b opposite from the display surface 10a.

The first adhesive sheet 30 and the second adhesive sheet 40 are sheets for attaching the display panel 10 to the housing 20 and each have adhesion on both surfaces thereof. The first adhesive sheet 30 is affixed to the back surface 10b of the display panel 10. The second adhesive sheet 40 is affixed to the first adhesive sheet 30 and to the housing 20. That is, one surface of the first adhesive sheet 30 is affixed the reflection film 11 of the display panel 10, and the other surface of the first adhesive sheet 30 on the opposite side is affixed to the second adhesive sheet 40. One surface of the second adhesive sheet 40 is affixed to the first adhesive sheet 30, and the other surface of the second adhesive sheet 40 on the opposite side is affixed to the inner surface of the housing 20.

The base material of each of the first adhesive sheet 30 and the second adhesive sheet 40 is not particularly limited, and may be a resin such as polyethylene terephthalate (PET). The adhesive of each of the first adhesive sheet 30 and the second adhesive sheet 40, which generates adhesion of both surfaces thereof, is not particularly limited, and may be an acrylic adhesive or the like.

The first adhesive sheet 30 has adhesion (slight adhesion) weaker than the adhesion of the second adhesive sheet 40. In particular, although details will be described below, among the adhesions of both surfaces of the first adhesive sheet 30 and the second adhesive sheet 40, a first adhesion of the first adhesive sheet 30 to the display panel 10 (the adhesion of the one surface of the first adhesive sheet 30) is weaker than a second adhesion of the second adhesive sheet 40 to the housing 20 (the adhesion of the other surface of the second adhesive sheet 40).

Thus, the first adhesive sheet 30 and the second adhesive sheet 40 function as members for attaching the display panel 10 to the housing 20, and also function as members that allow the display panel 10 to be easily removed from the housing 20 when reusing the display panel 10. Both surfaces of the first adhesive sheet 30 may have the first adhesion, and both surfaces of the second adhesive sheet 40 may have the second adhesion.

Figure 2:
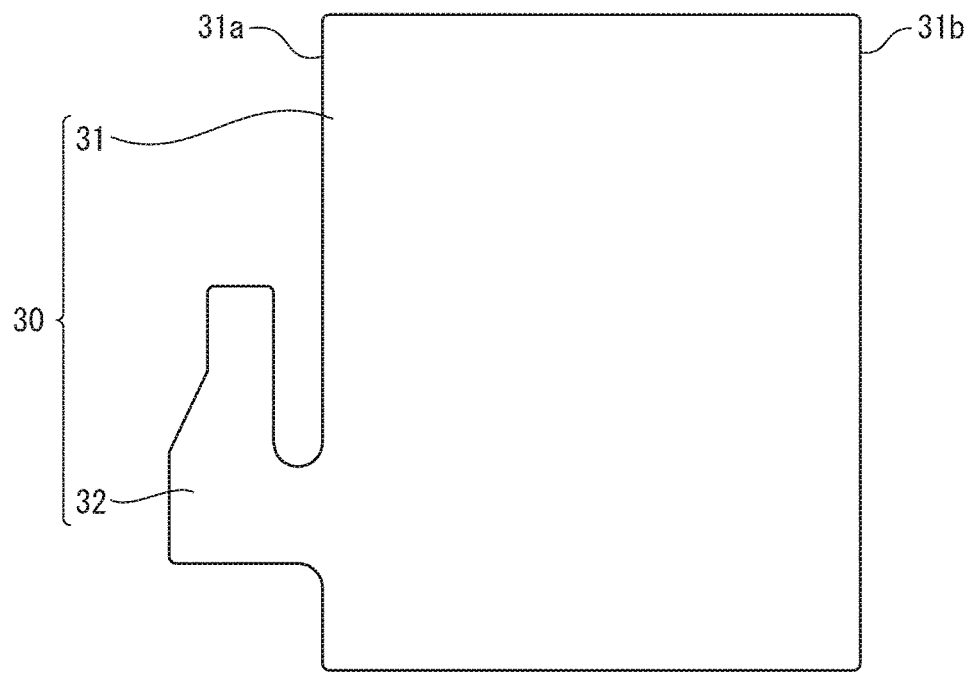
FIG. 2 is a plan view illustrating the configuration of a first adhesive sheet according to the first embodiment.
Figure 3:
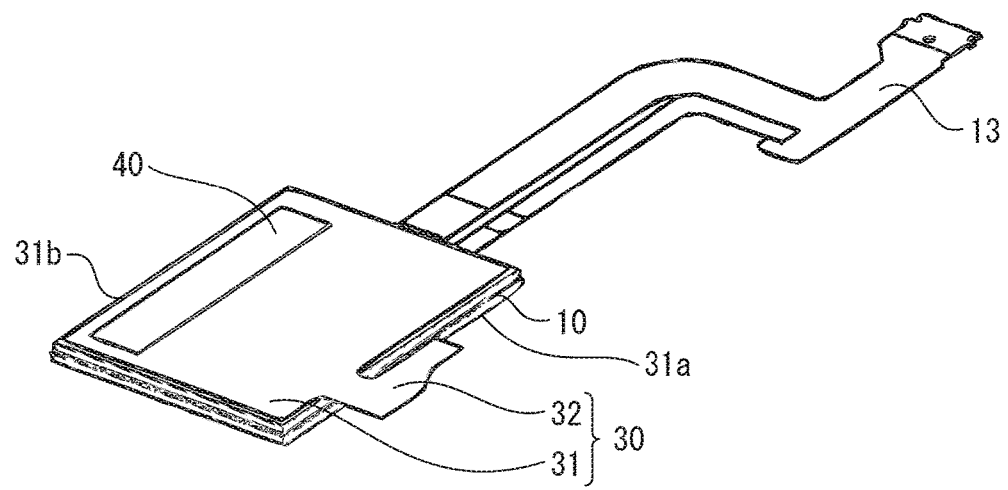
FIG. 3 is a perspective view, as seen from the back side, of a display panel according to the first embodiment, to which the first adhesive sheet and a second adhesive sheet are affixed.

FIG. 2 is a plan view illustrating the configuration of the first adhesive sheet 30 according to the first embodiment. FIG. 3 is a perspective view, as seen from the back side, of the display panel 10 according to the first embodiment, to which the first adhesive sheet 30 and the second adhesive sheet 40 are affixed.

As illustrated in FIGS. 1A to 3, the first adhesive sheet 30 includes an affixing region 31 and a removal tab 32. The affixing region 31 is a region to which the display panel 10 and the second adhesive sheet 40 are affixed. One surface of the affixing region 31 is affixed to the back surface 10b of the display panel 10 (that is, the front surface of the reflection film 11), and the other surface of the affixing region 31 is affixed to the second adhesive sheet 40. The affixing region 31 has adhesion on the entireties of both surfaces thereof. The affixing region 31 has an area such that the affixing region 31 can cover substantially the entirety of the back surface 10b of the display panel 10.

The removal tab 32 is a region that a user holds when removing the display panel 10 attached to the housing 20. The removal tab 32 extends from the affixing region 31 toward the outside of the display panel 10. The removal tab 32 may extend from any part of the affixing region 31. An end portion of the affixing region 31 from which the removal tab 32 extends will be referred to as a "first end portion 31a", and an end portion of the affixing region 31 on a side opposite from the first end portion 31a will be referred to as a "second end portion 31b". A user can remove the display panel 10, together with the first adhesive sheet 30, from the housing 20 by holding and pulling the removal tab 32. Both surfaces of the removal tab 32 may not have adhesion, in contrast to the affixing region 31.

The removal tab 32 may be integrally formed with the affixing region 31. The affixing region 31 and the removal tab 32 may be independently formed and affixed to each other. In a case where the removal tab 32 and the affixing region 31 are integrally formed, both surfaces of the removal tab 32 are provided with adhesion in order to provide both surfaces of the affixing region 31 with adhesion. In this case, it may be difficult for a user to hold the removal tab 32 because the removal tab 32 may adhere to another member (the housing 20 or the like). Therefore, in this case, adhesion of both surfaces of the removal tab 32 may be made ineffective by performing printing or the like on the both surfaces.

As illustrated in FIG. 1B and FIG. 3, the second adhesive sheet 40 affixes the first adhesive sheet 30 and the inner surface of the housing 20 to each other. One surface of the second adhesive sheet 40 is affixed to the affixing region 31 of the first adhesive sheet 30, and the other surface of the second adhesive sheet 40 is affixed to the inner surface of the housing 20. The second adhesive sheet 40 may have substantially the same area as the affixing region 31 of the first adhesive sheet 30. However, the second adhesive sheet 40 may have a smaller area than the affixing region 31 of the first adhesive sheet 30. In this case, when removing the display panel 10 from the housing 20, a user can easily remove the first adhesive sheet 30 from the second adhesive sheet 40.

The second adhesive sheet 40 may be affixed to the affixing region 31 in such a way that the second adhesive sheet 40 is placed closer to the second end portion 31b on the opposite side than to the first end portion 31a of the affixing region 31 of the first adhesive sheet 30, where the removal tab 32 is disposed. Also in this case, when removing the display panel 10 from the housing 20, a user can easily remove the first adhesive sheet 30 from the second adhesive sheet 40. In the example illustrated in FIG. 3, the second adhesive sheet 40 extends along the second end portion 31b of the affixing region 31 of the first adhesive sheet 30.

Thus, the first adhesive sheet 30 and the second adhesive sheet 40 are affixed to the display panel 10 in such way that, when the display panel 10 is viewed in a direction normal to the display surface 10a, the affixing region 31 of the first adhesive sheet 30 and the second adhesive sheet 40 are invisible behind the display panel 10 and the removal tab 32 of the first adhesive sheet 30, which protrudes from an end portion of the display panel 10, is visible.

As illustrated in FIGS. 1A and 3, a flexible printed circuit (FPC) 13 is connected to one side of the display panel 10. One end portion (first end portion) of the FPC 13 is connected to the one side of the display panel 10. The FPC 13 extends from the one end portion (first end portion) toward the opposite end portion (second end portion). When the display panel 10 is attached to the housing 20, the FPC 13, which extends from the first end portion, is folded back at a middle portion thereof and extends in a space between the first adhesive sheet 30 and the housing 20 below the display panel 10, and the second end portion of the FPC 13 is connected to a drive circuit and the like.

Method of Removing Display Panel 10 from Housing 20

Figure 4A:
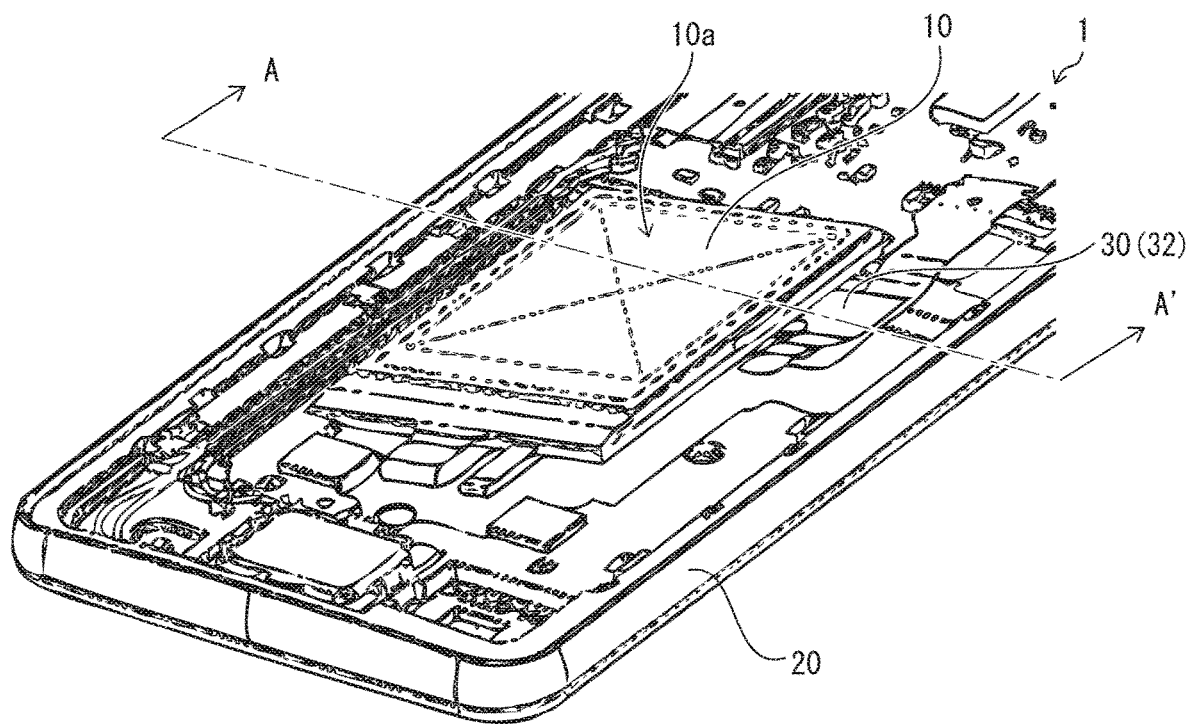
FIG. 4A is perspective view illustrating a state in which the first adhesive sheet is being removed from the second adhesive sheet in the electronic device according to the first embodiment.
Figure 4B:
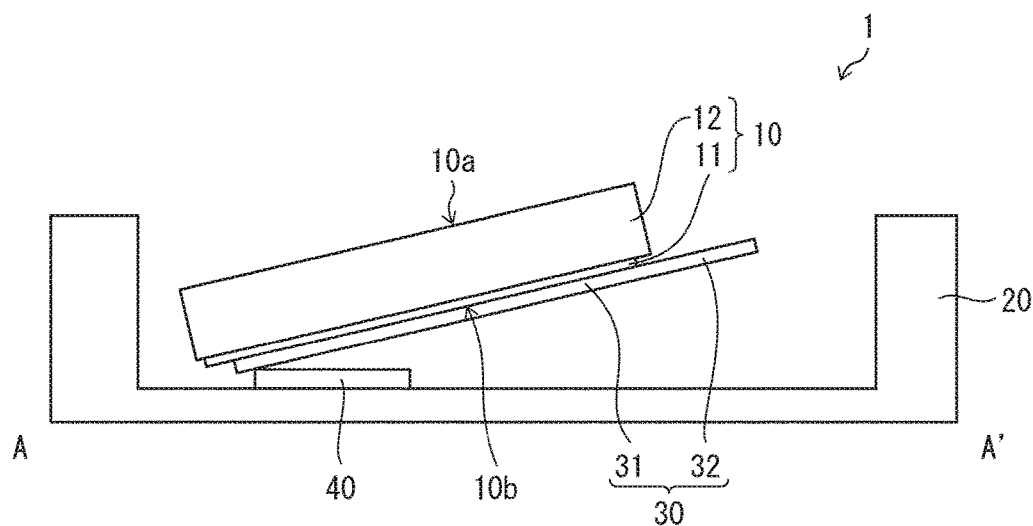
FIG. 4B is a sectional view taken along line A-A' in FIG. 4A.
Figure 5A:
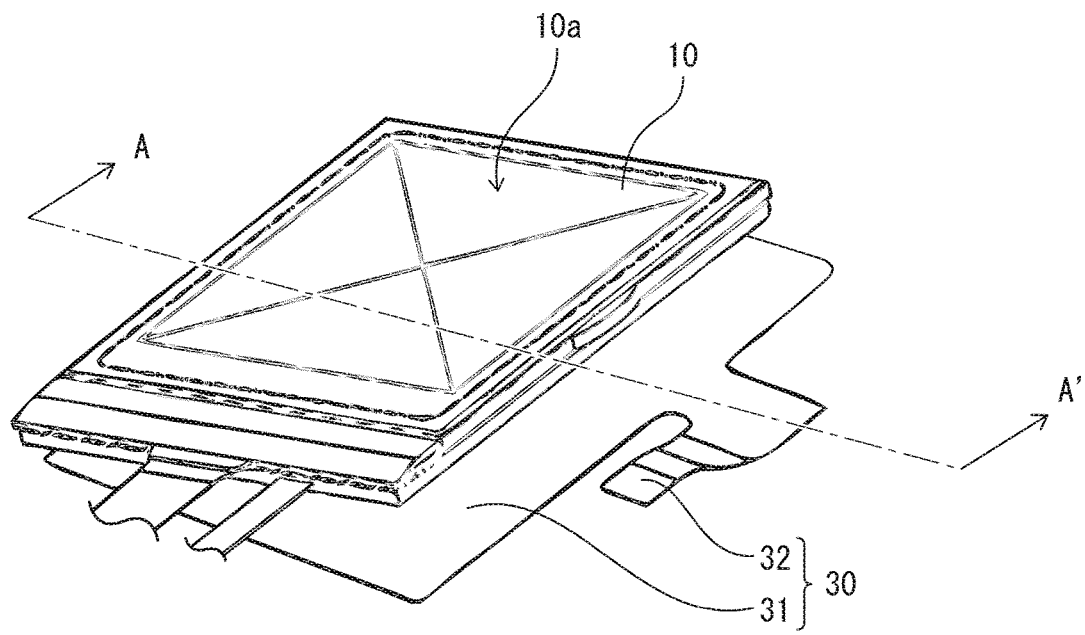
FIG. 5A is a perspective view illustrating a state in which the display panel is being removed from the first adhesive sheet in the electronic device according to the first embodiment.
Figure 5B:
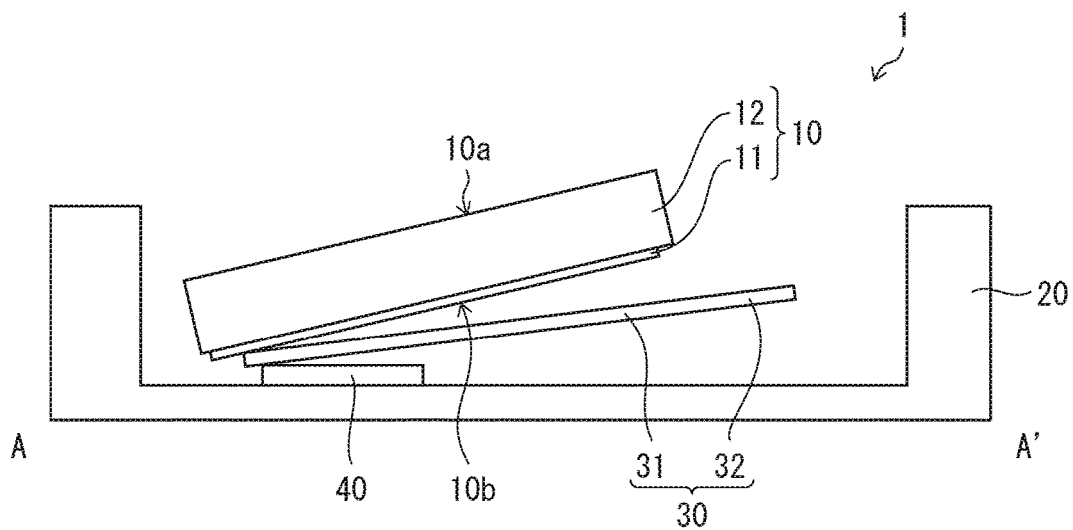
FIG. 5B is a sectional view taken along line A-A' in FIG. 5A.

FIG. 4A is perspective view illustrating a state in which the first adhesive sheet 30 is being removed from the second adhesive sheet 40 in the electronic device 1 according to the first embodiment. FIG. 4B is a sectional view taken along line A-A' in FIG. 4A. FIG. 5A is a perspective view illustrating a state in which the display panel 10 is being removed from the first adhesive sheet 30 in the electronic device 1 according to the first embodiment. FIG. 5B is a sectional view taken along line A-A' in FIG. 5A.

As illustrated in FIG. 1, in the electronic device 1, the display panel 10 is attached to the inner surface of the housing 20 via the first adhesive sheet 30 and the second adhesive sheet 40. There is a case where the display panel 10 is reused.

In this case, as illustrated in FIGS. 4A and 4B, the inside of the housing 20 of the electronic device 1, to which the display panel 10 is attached, is exposed. Then, the removal tab 32 of the first adhesive sheet 30 is exposed. A user holds the removal tab 32 and pull the removal tab 32 in a direction away from the inner surface of the housing 20.

Here, as described above, among the adhesions of both surfaces of the first adhesive sheet 30 and the second adhesive sheet 40, the first adhesion of the first adhesive sheet 30 to the display panel 10 (the adhesion of the one surface of the first adhesive sheet 30) is weaker than the second adhesion of the second adhesive sheet 40 to the housing 20 (the adhesion of the other surface of the second adhesive sheet 40).

Therefore, when the removal tab 32 is pulled, the first adhesive sheet 30 is removed, together with the display panel 10, from the second adhesive sheet 40, while the second adhesive sheet 40 continues to be affixed to the inner surface of the housing 20.

Next, as illustrated in FIGS. 5A and 5B, the user pinches the display panel 10 and removes the display panel 10 from the first adhesive sheet 30. By making the adhesion of the one surface of the first adhesive sheet 30 weaker than the second adhesion of the second adhesive sheet 40, the first adhesive sheet 30 can be cleanly removed from the back surface 10b of the display panel 10. That is, breakage of the reflection film 11 of the display panel 10 can be suppressed.

Thus, the electronic device 1 can suppress breakage of the display panel 10 when a user removes the display panel 10 from the housing 20. Therefore, the electronic device 1 allows the display panel 10 to be easily reused.

In addition, because a holder for attaching the display panel 10 to the housing is not used, it is possible to reduce cost by reducing the number of components, to reduce size and thickness, and to reduce the inclination of the display surface 10a.

For example, the first adhesion of the first adhesive sheet 30 to the display panel 10 may be approximately 0.3 N/cm, and the second adhesion of the second adhesive sheet 40 to the housing 20 (the adhesion of the other surface of the second adhesive sheet 40) may be approximately 6 N/cm. In this case, the second adhesion is approximately twenty times stronger than the first adhesion. The values of the first adhesion and the second adhesion described above are examples, and the first adhesion only need to be weaker than the second adhesion.

The adhesion of a surface (the other surface) of the first adhesive sheet 30 to the second adhesive sheet 40 may be approximately the same as the first adhesion. Moreover, the adhesion a surface (the one surface) of the second adhesive sheet 40 to the first adhesive sheet 30 may be approximately the same as the second adhesion.

As described above, the first adhesive sheet 30 includes the affixing region 31 to which the display panel 10 is affixed, and the removal tab 32 that extends from the affixing region 31 toward the outside of the display panel 10. Therefore, a user can remove the first adhesive sheet 30 from the second adhesive sheet 40 by pinching and pulling the removal tab 32. Thus, the user can easily remove the display panel 10 from the housing 20.

As illustrated in FIGS. 2 and 3, the removal tab 32 may be formed in the same plane as the affixing region 31. Alternatively, the removal tab 32 may have a stepped shape as illustrated in FIGS. 4A, 4B, 5A, and 5B. By forming the removal tab 32 in the stepped shape, the distance between the removal tab 32 and the inner surface of the housing 20 is increased, and therefore a user can easily hold the removal tab 32.

As illustrated in FIGS. 4A, 4B, 5A, and 5B, the second adhesive sheet 40 may be affixed to the affixing region 31 in such a way that the second adhesive sheet 40 is placed closer to the second end portion 31*b* on the opposite side than to the first end portion 31*a* of the affixing region 31 of the first adhesive sheet 30, where the removal tab 32 is disposed. In this case, when the removal tab 32 is pulled, the first adhesive sheet 30 can be easily removed from the second adhesive sheet 40.

Second Embodiment

Figure 6A:
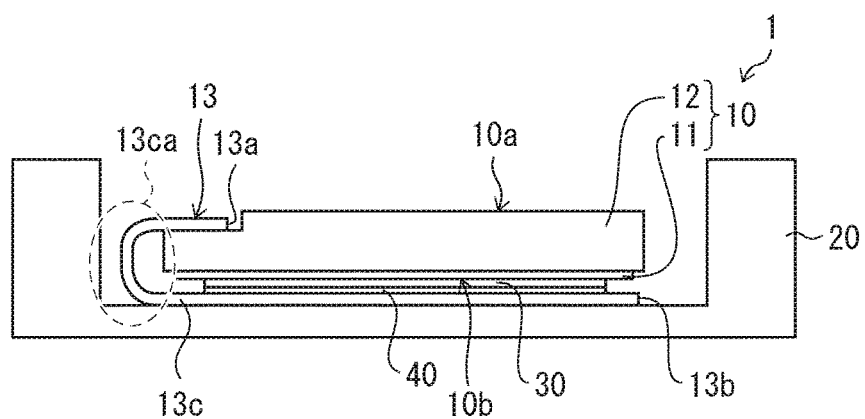
FIG. 6A is a sectional view illustrating the structure of an electronic device according to a comparative example of a second embodiment in a normal state.
Figure 6B:
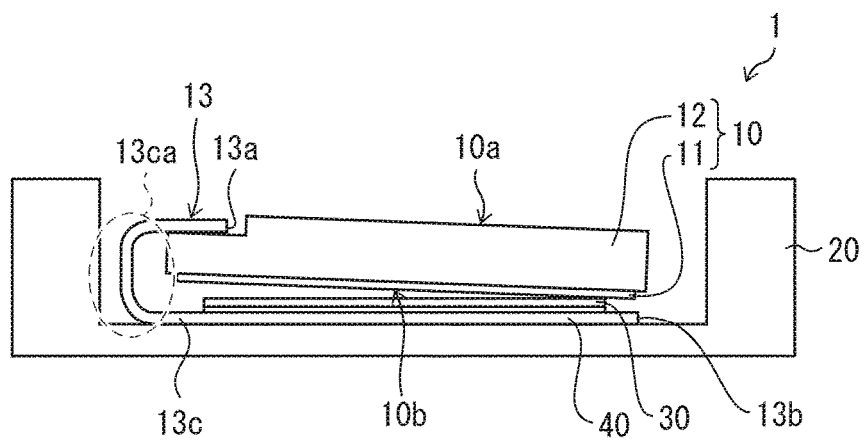
FIG. 6B is a sectional view illustrating a state in which a display panel has risen from a first adhesive sheet in the electronic device illustrated in FIG. 6A.

A second embodiment of the present disclosure will be described. For convenience of description, members that have the same functions as the members described in the first embodiment will be denoted by the same numerals, and descriptions thereof will not be repeated. FIG. 6A is a sectional view illustrating the structure of an electronic device 1 according to a comparative example of the second embodiment in a normal state. FIG. 6B is a sectional view illustrating a state in which a display panel 10 has risen from a first adhesive sheet 30 in the electronic device 1 illustrated in FIG. 6A.

First, referring to FIGS. 6A and 6B, the comparative example of the second embodiment will be described. The electronic device 1 illustrated in FIGS. 6A and 6B has the same configuration as the electronic device 1 described in the first embodiment. As illustrated in FIG. 6A, in the electronic device 1, the display panel 10 is affixed to an inner surface of a housing 20 via the first adhesive sheet 30 and a second adhesive sheet 40.

A FPC 13 is connected to one side of the display panel 10. A first end portion 13*a*, which is one end portion of the FPC 13, is connected to the one side of the display panel 10. The FPC 13 includes an extension portion 13*c* that extends from the first end portion 13*a* to a second end portion 13*b*. When the display panel 10 is attached to the housing 20, the extension portion 13*c* of the FPC 13 extends from the first end portion 13*a* toward the outside of the display panel 10, is further folded back at a folded portion 13*ca*, passes between the first adhesive sheet 30 and the housing 20, and reaches the second end portion 13*b*.

Although the FPC 13 has flexibility, an urging force is generated at the folded portion 13*ca*. Therefore, as illustrated in FIG. 6B, a part of the back surface 10*b* of the display panel 10 near the side to which the FPC 13 is connected may become separated from the first adhesive sheet 30.

Figure 7A:
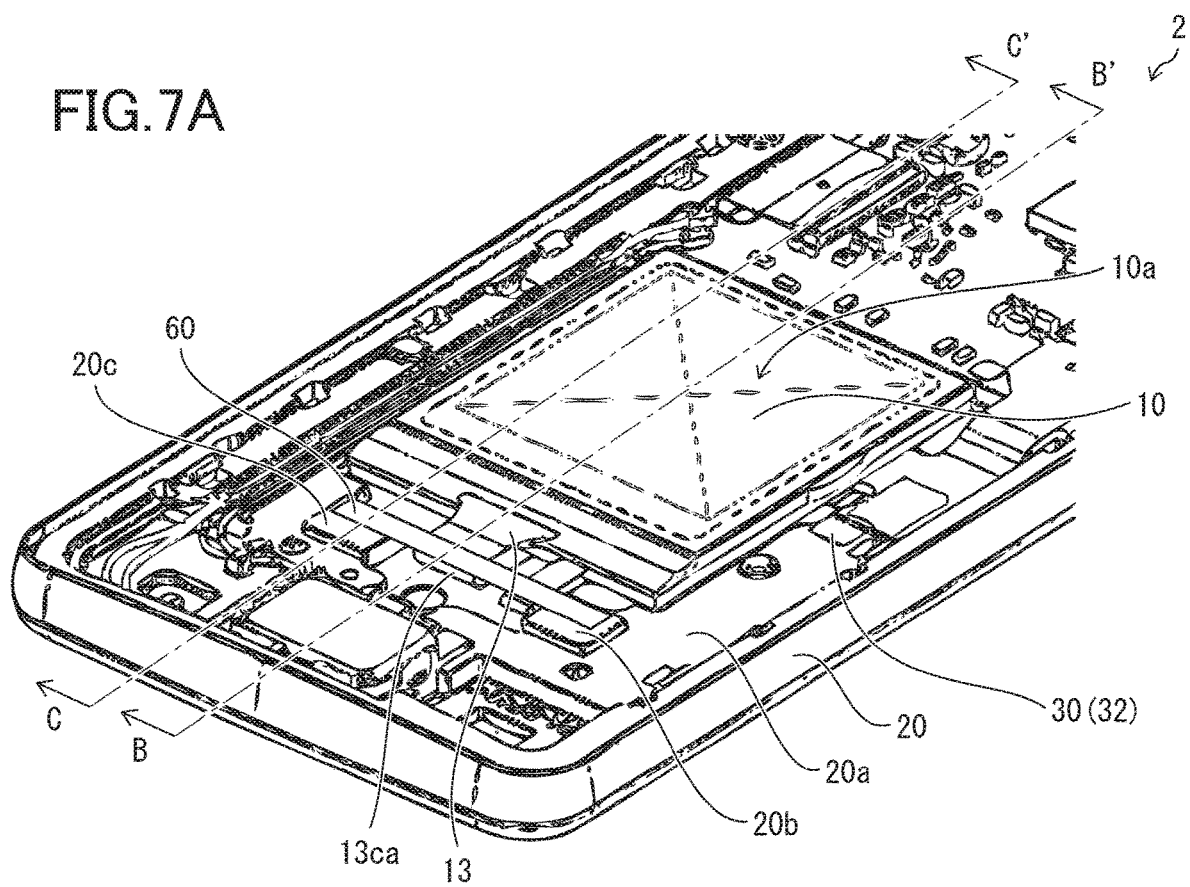
FIG. 7A is a perspective view illustrating the internal structure of an electronic device according to the second embodiment.
Figure 7B:
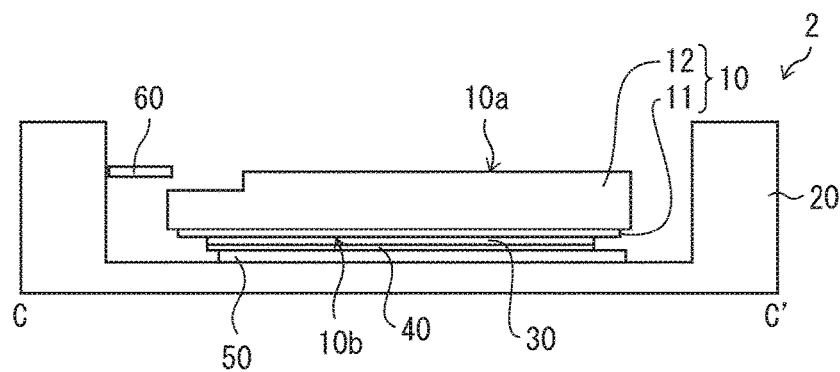
FIG. 7B is a sectional view taken along line C-C' in FIG. 7A.
Figure 7C:
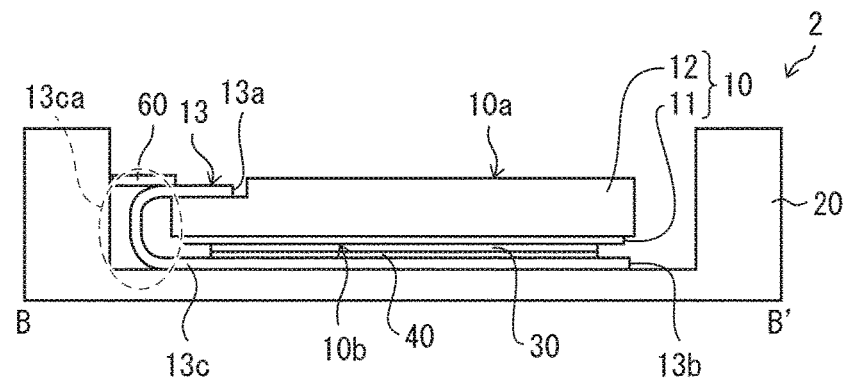
FIG. 7C is a sectional view taken along line B-B' in FIG. 7A.

FIG. 7A is a perspective view illustrating the internal structure of an electronic device 2 according to the second embodiment. FIG. 7B is a sectional view taken along line C-C' in FIG. 7A. FIG. 7C is a sectional view taken along line B-B' in FIG. 7A. The electronic device 2 has the same structure as the electronic device 1 (FIG. 1 and other figures) and further includes a rise-suppressing member 60. As with the electronic device 1, in the electronic device 2, a display panel 10 is attached to an inner surface 20*a* of a housing 20 via a first adhesive sheet 30 and a second adhesive sheet 40.

Protruding portions 20*b* and 20*c* are formed on the inner surface 20*a* of the housing 20 so as to protrude from the inner surface 20*a*. The protruding portions 20*b* and 20*c* are disposed so as to be separated from each other so that a folded portion 13*ca* of a FPC 13 is interposed therebetween in a state in which the display panel 10 is attached to the housing 20. The rise-suppressing member 60 is disposed so as to connect top surfaces of the protruding portions 20*b* and 20*c*. For example, the rise-suppressing member 60 has a plate-like shape.

Thus, the rise-suppressing member 60 is disposed so as to face the housing 20 is a state in which the FPC 13 is interposed between the rise-suppressing member 60 and the housing 20. The rise-suppressing member 60 contacts a region of an extension portion 13*c* of the FPC 13 between a first end portion 13*a* and the folded portion 13*ca* and presses the region. Thus, the rise-suppressing member 60 can suppress separation of the display panel 10 and the first adhesive sheet 30 from each other, which may be caused by an urging force of the folded portion 13*ca* of the FPC 13.

Third Embodiment

Figure 8:
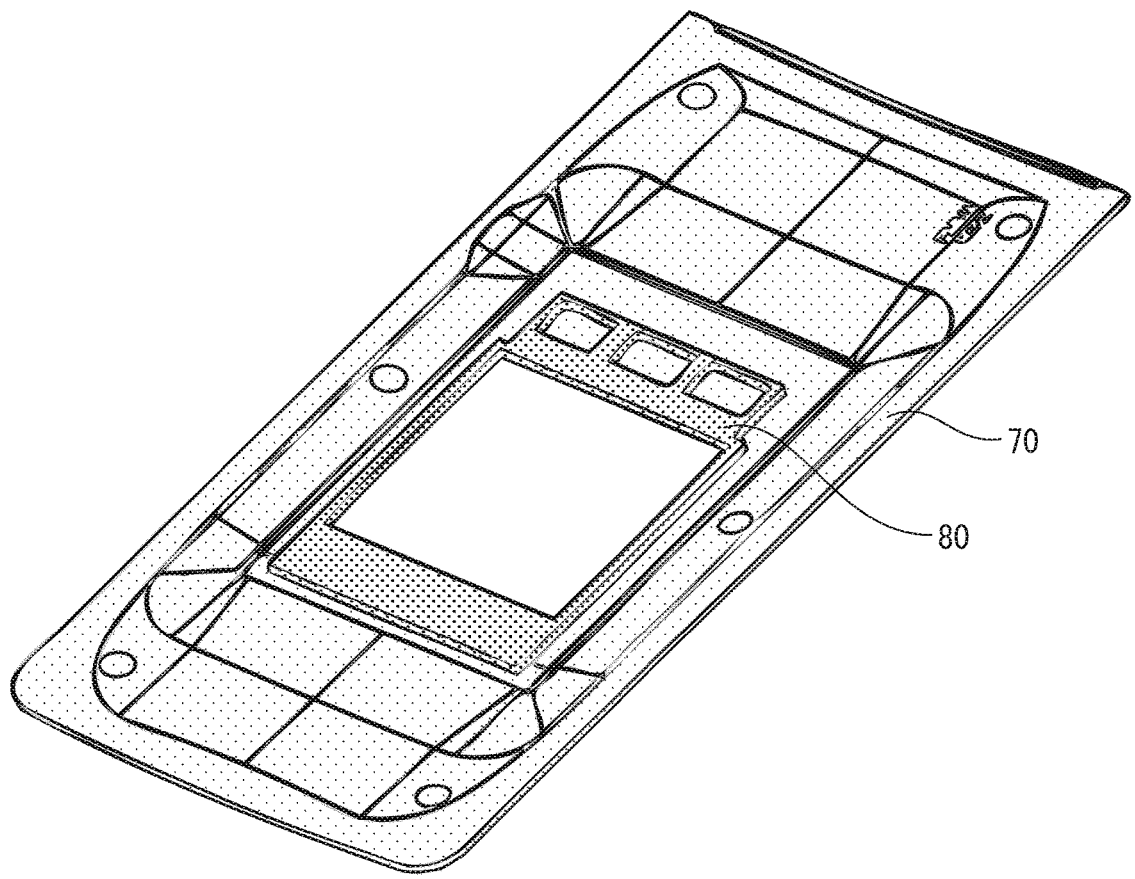
FIG. 8 is a perspective view illustrating the structure of a back surface of a cover of an electronic device according to a comparative example of a third embodiment.
Figure 9:
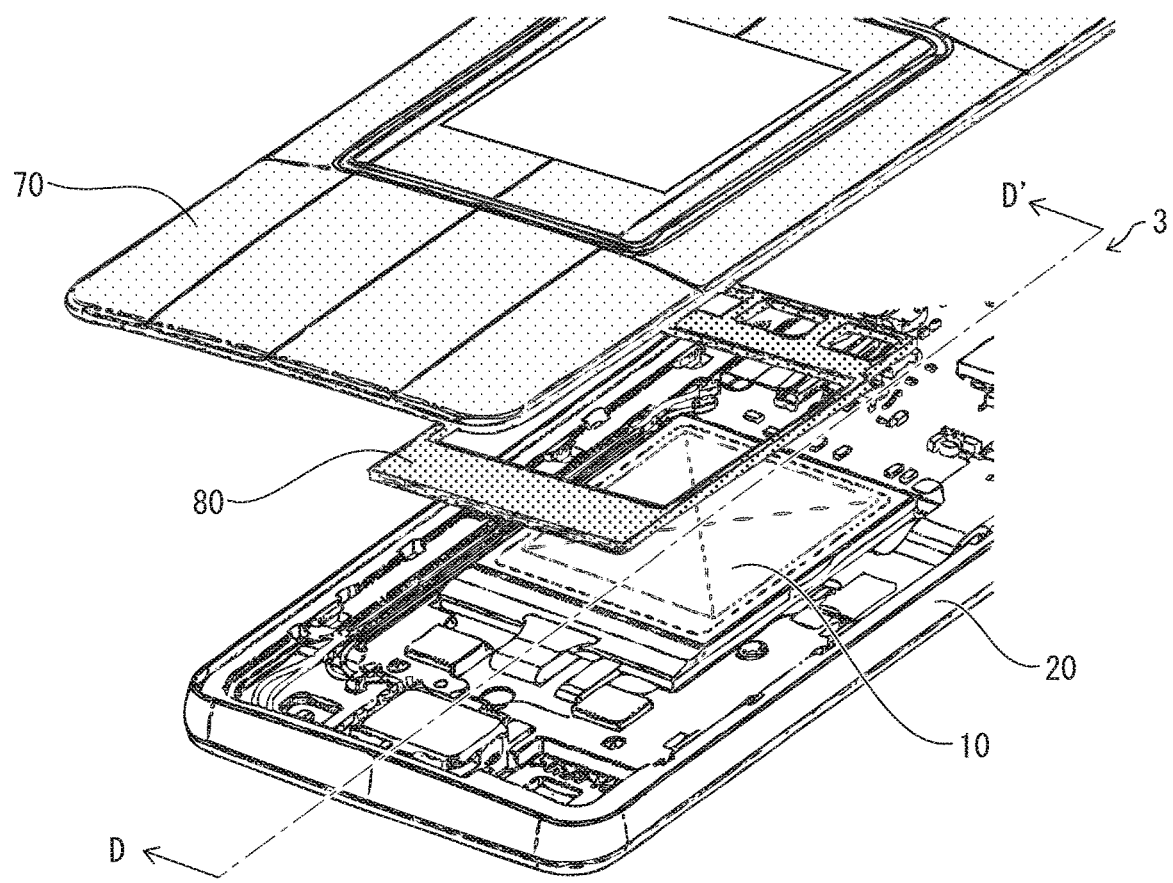
FIG. 9 is a perspective view illustrating a state in which the cover is being attached to a housing in the electronic device according to the comparative example of the third embodiment.

A third embodiment of the present disclosure will be described. For convenience of description, members that have the same functions as the members described in the first and second embodiments will be denoted by the same numerals, and descriptions thereof will not be repeated. FIG. 8 is a perspective view illustrating the structure of a back surface of a cover 70 of an electronic device 3 according to a comparative example of the third embodiment. FIG. 9 is a perspective view illustrating a state in which the cover 70 is being attached to a housing 20 in the electronic device 3 according to the comparative example of the third embodiment. The electronic device 3 has the same structure as the electronic device 1 (FIGS. 1A and 1B and other figures) and further includes the cover 70 and a cushion member 80.

By being fitted into the housing 20, the cover 70 forms a pair with the housing 20 to cover a display panel 10 attached to the inner surface of the housing 20. For example, the display panel 10 is a back-side display panel of the electronic device 3. That is, the housing 20 can be represented as a front-side housing of the electronic device 3, and the cover 70 can be represented as a back-side housing of the electronic device 3. The cushion member 80 absorbs shock that is applied to the display panel 10 when, for example, the electronic device 3 drops. The cushion member 80 has a shape that overlaps a frame region that surrounds the image display region of the display panel 10.

The cover 70 and the cushion member 80 each have an opening that has approximately the same area as the image display region of the display panel 10. The cover 70 is attached to the housing 20 in such a way that the openings of the cover 70 and the cushion member 80 overlap the image display region of the display panel 10.

Figure 10A:
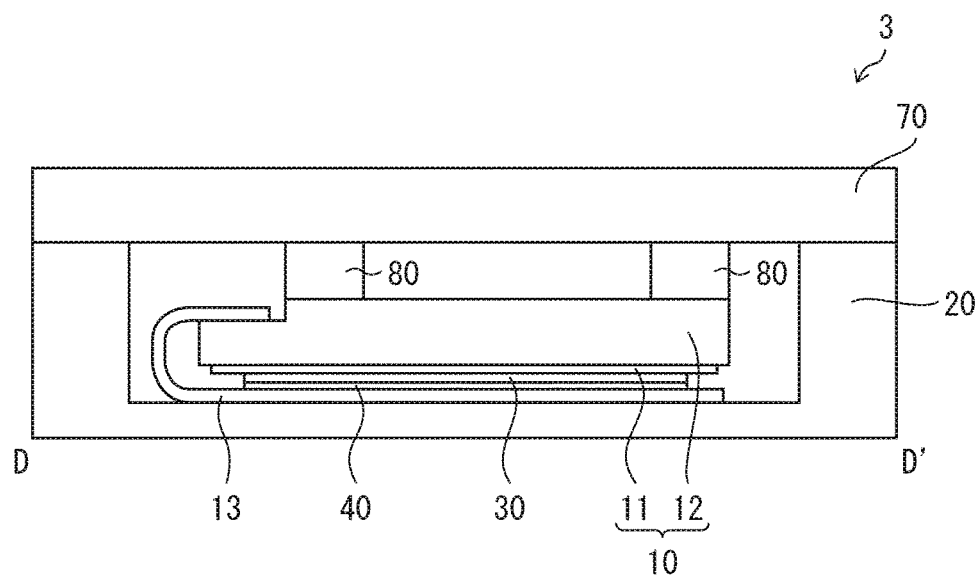
FIG. 10A is sectional view taken along line D-D' in FIG. 9 of the electronic device according to the comparative example of the third embodiment in a state in which the cover is attached.
Figure 10B:
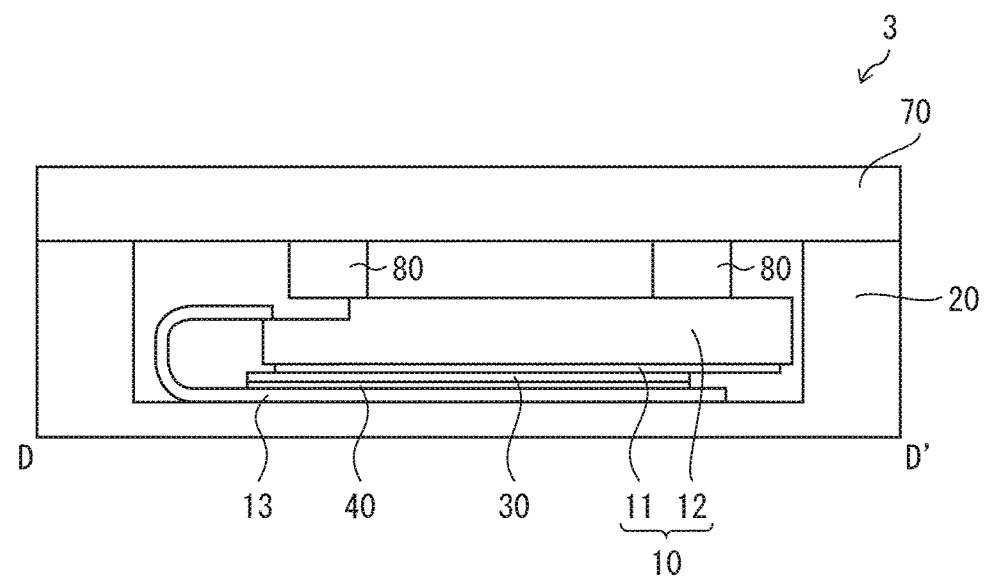
FIG. 10B is a sectional view illustrating a state in which a display panel is displaced in the electronic device illustrated in FIG. 10A.

FIG. 10A is sectional view taken along line D-D' in FIG. 9 of the electronic device 3 according to the comparative example of the third embodiment in a state in which the cover 70 is attached. FIG. 10B is a sectional view illustrating a state in which the display panel 10 is displaced in the electronic device 3 illustrated in FIG. 10A.

As illustrated in FIG. 10A, when the cover 70 is attached to the housing 20, the cushion member 80 is interposed between the cover 70 and the frame region of the display panel 10 and overlaps the frame region of the display panel 10. The cushion member 80 absorbs shock applied to the display panel 10. However, as illustrated in FIG. 10B, the display panel 10 may become removed from the first adhesive sheet 30 and the position of the display panel 10 may become displaced, depending on the magnitude of shock applied to the electronic device 3 due to dropping or the like.

If the display panel 10 becomes displaced from a predetermined position, the FPC 13, which is connected to the display panel 10, may break.

Figure 11:
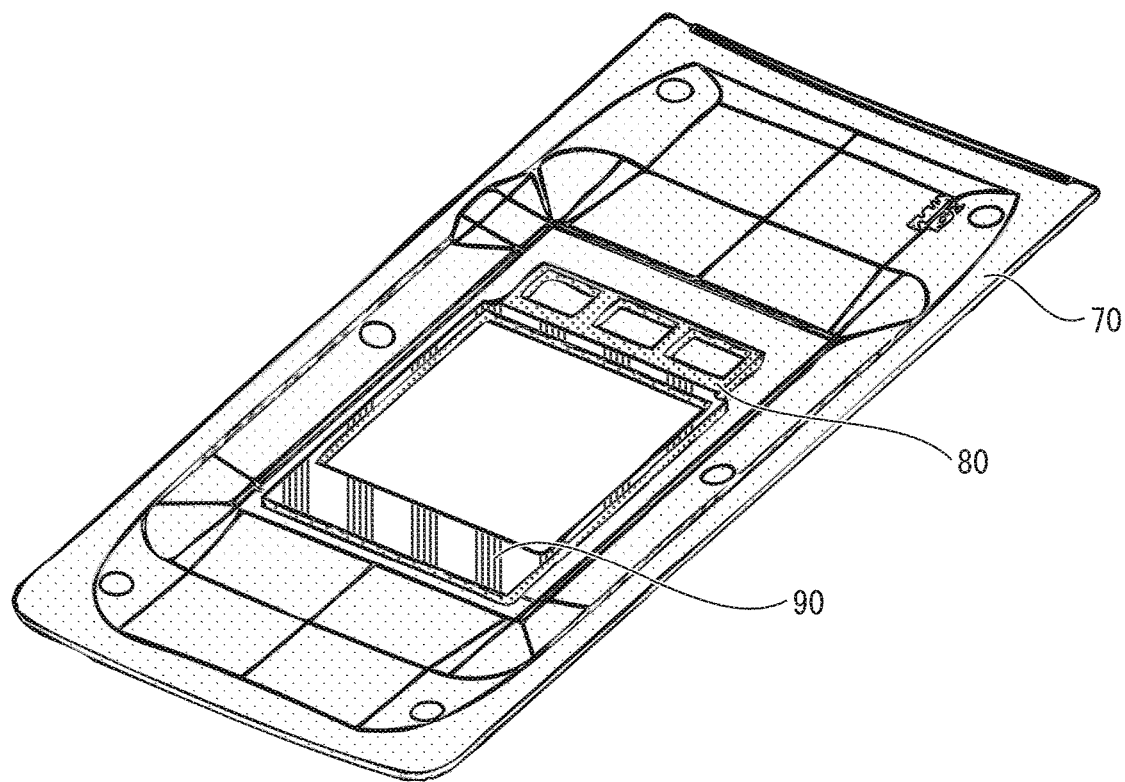
FIG. 11 is a perspective view illustrating the structure of a back surface of a cover of an electronic device according to the third embodiment.
Figure 12:
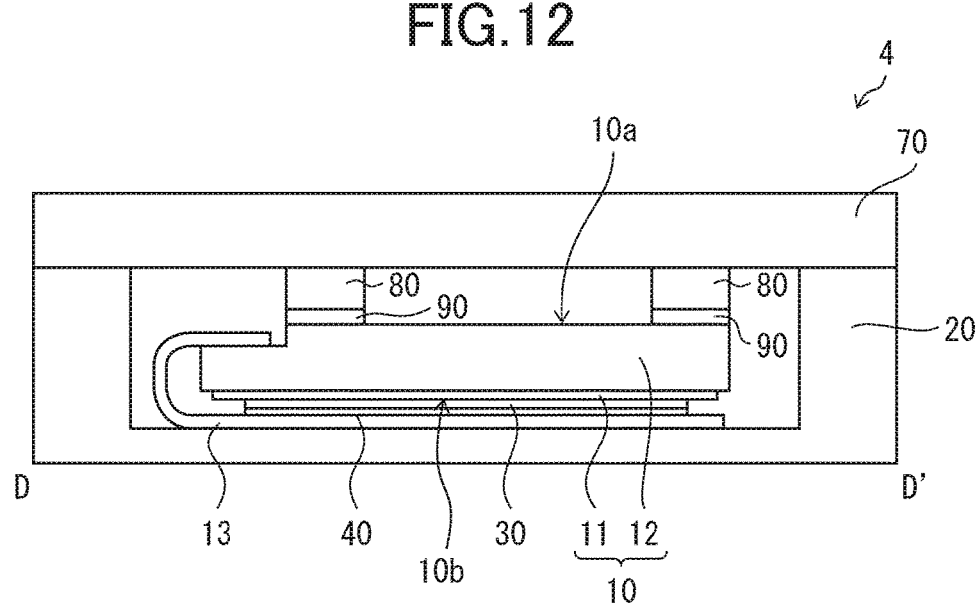
FIG. 12 is sectional view taken along line D-D' in FIG. 9 of the electronic device according to the third embodiment in a state in which the cover illustrated in FIG. 11 is attached.

FIG. 11 is a perspective view illustrating the structure of a back surface of a cover 70 of an electronic device according to the third embodiment. FIG. 12 is sectional view taken along line D-D' in FIG. 9 of an electronic device 4 according to the third embodiment in a state in which the cover 70 illustrated in FIG. 11 is attached.

The electronic device 4 has the same structure as the electronic device 3 (FIGS. 8 to 10B) and further includes a third adhesive sheet 90. As illustrated in FIGS. 11 and 12, the third adhesive sheet 90, which is a sheet for affixing a cushion member 80 and a display panel 10 to each other, has adhesion on both surfaces thereof. The third adhesive sheet 90 is affixed to a surface of the cushion member 80, which is attached to the cover 70. Thus, in a state in which the cover 70 is attached to the housing 20, the third adhesive sheet 90 is interposed between the cushion member 80 and the display panel 10 and fixes the cushion member 80 and the display panel 10. For example, the third adhesive sheet 90 has an opening having substantially the same area as an opening formed in the cushion member 80, and has a shape that surrounds the opening in a frame-like shape.

Thus, the electronic device 4 includes the housing 20 to which a second adhesive sheet 40 is affixed, and the cover 70 that forms a pair with the housing 20 to cover the display panel 10 attached to the housing 20. The electronic device 4 further includes the cushion member 80, which is affixed to the housing 20 and which has a shape that overlaps the frame region that surrounds the image display region of the display panel 10, and the third adhesive sheet 90, which affixes the cushion member 80 and the display panel 10 to each other. Thus, the cushion member 80 and the display panel 10 are fixed to each other via the third adhesive sheet 90. Therefore, displacement of the position of the display panel 10 due to shock of dropping or the like can be suppressed. Further, removal of the display panel 10 from the housing 20 can be suppressed.

Among the adhesions of both surfaces of the third adhesive sheet 90, at least the adhesion of a contact surface that contacts the display panel 10 may be weaker than the second adhesion of the second adhesive sheet 40 to the housing 20. In this case, even if the display surface 10a of the display panel 10 is formed of a film, breakage of the display panel 10 is suppressed when a user removes the display panel 10 from the third adhesive sheet 90. Among both surfaces of the third adhesive sheet 90, the adhesion of the contact surface that contacts the display panel 10 may be the same as the first adhesion. Further, the adhesions of both surfaces of the third adhesive sheet 90 may be the same as the first adhesion.

Fourth Embodiment

Figure 13:
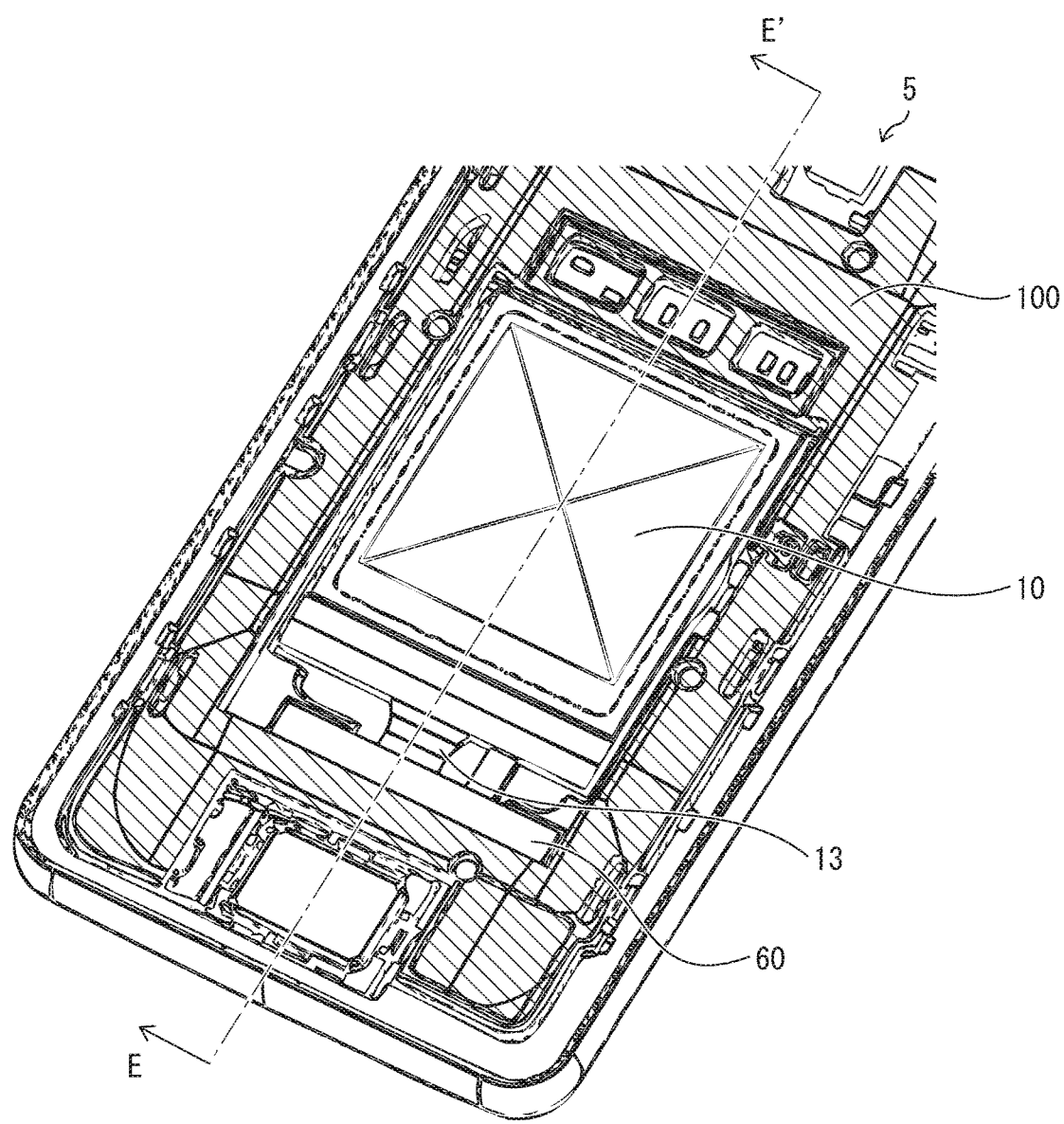
FIG. 13 is a perspective view illustrating the internal structure of an electronic device according to a comparative example of a fourth embodiment.
Figure 14A:
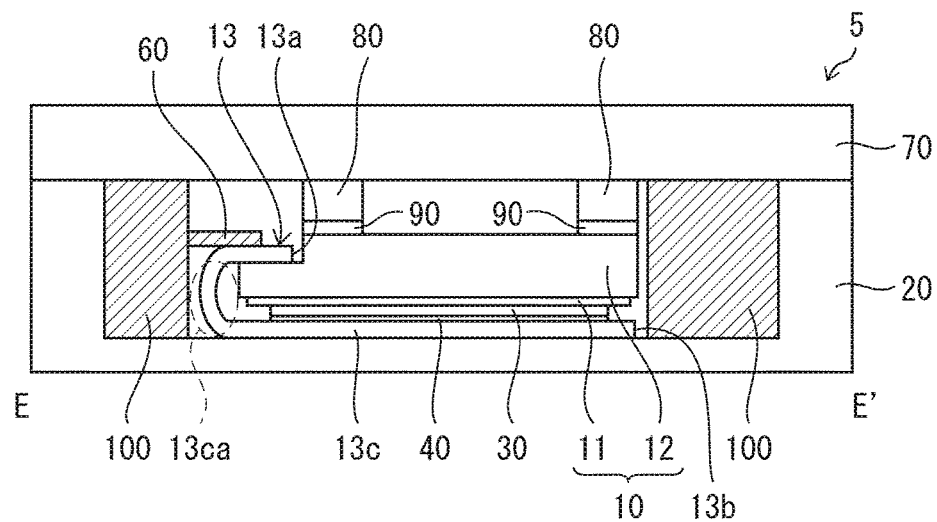
FIG. 14A is a sectional view taken along line E-E' in FIG. 13 of the electronic device according to the comparative example of the fourth embodiment in a state in which the cover illustrated in FIG. 11 is attached.
Figure 14B:
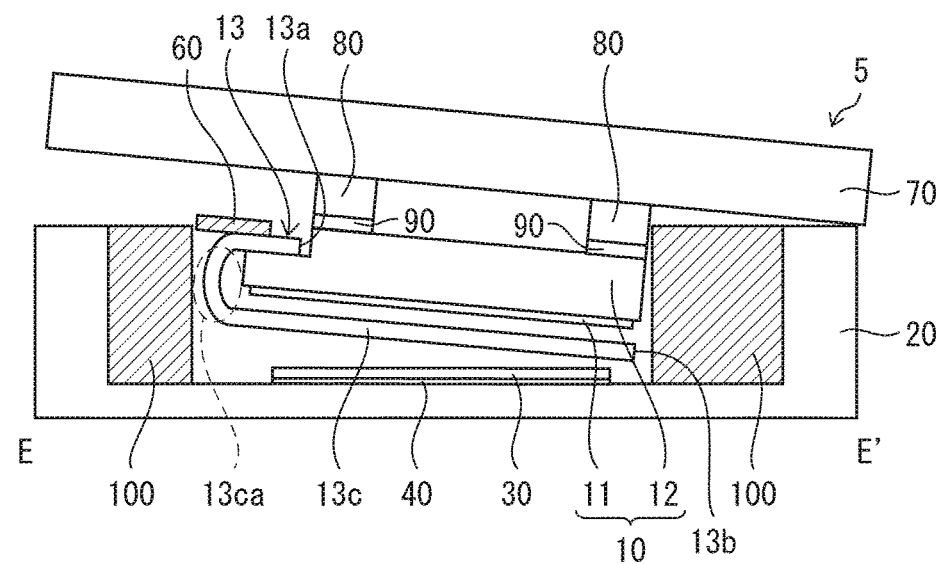
FIG. 14B is a sectional view illustrating a state in which a display panel has risen from a housing in the electronic device illustrated in FIG. 14A.

A fourth embodiment of the present disclosure will be described. For convenience of description, members that have the same functions as the members described in the first to third embodiments will be denoted by the same numerals, and descriptions thereof will not be repeated. FIG. 13 is a perspective view illustrating the internal structure of an electronic device 5 according to a comparative example of the fourth embodiment. FIG. 14A is a sectional view taken along line E-E' in FIG. 13 of the electronic device 5 according to the comparative example of the fourth embodiment in a state in which the cover 70 illustrated in FIG. 11 is attached. FIG. 14B is a sectional view illustrating a state in which a display panel 10 has risen from a housing 20 in the electronic device 5 illustrated in FIG. 14A.

The electronic device 5 further includes a rise-suppressing member 60 and an inner holder 100, in addition to the members of the electronic device 4 (FIG. 12). The position and shape of the rise-suppressing member 60 are similar to those in the electronic device 2 (FIGS. 7A to 7C). The inner holder 100 is disposed on an inner surface of the housing 20 and has a shape that surrounds the display panel 10. An opening is formed in a middle portion of the inner holder 100, and the display panel 10 and the rise-suppressing member 60 are disposed in the opening. That is, in a state in which the cover 70 is removed, the display panel 10 and the rise-suppressing member 60 are exposed.

As illustrated in FIG. 14A, when the cover 70 is attached to the housing 20, a third adhesive sheet 90 is interposed between a cushion member 80 and the display panel 10 and fixes the cushion member 80 and the display panel 10 to each other. As illustrated in FIG. 14B, when a user removes the cover 70, the display panel 10, which adheres to the third adhesive sheet 90, may become removed from a first adhesive sheet 30 together with the cover 70. If the display panel 10 rises from the housing 20 in this way, the FPC 13, which is connected to the display panel 10, may break.

Figure 15:
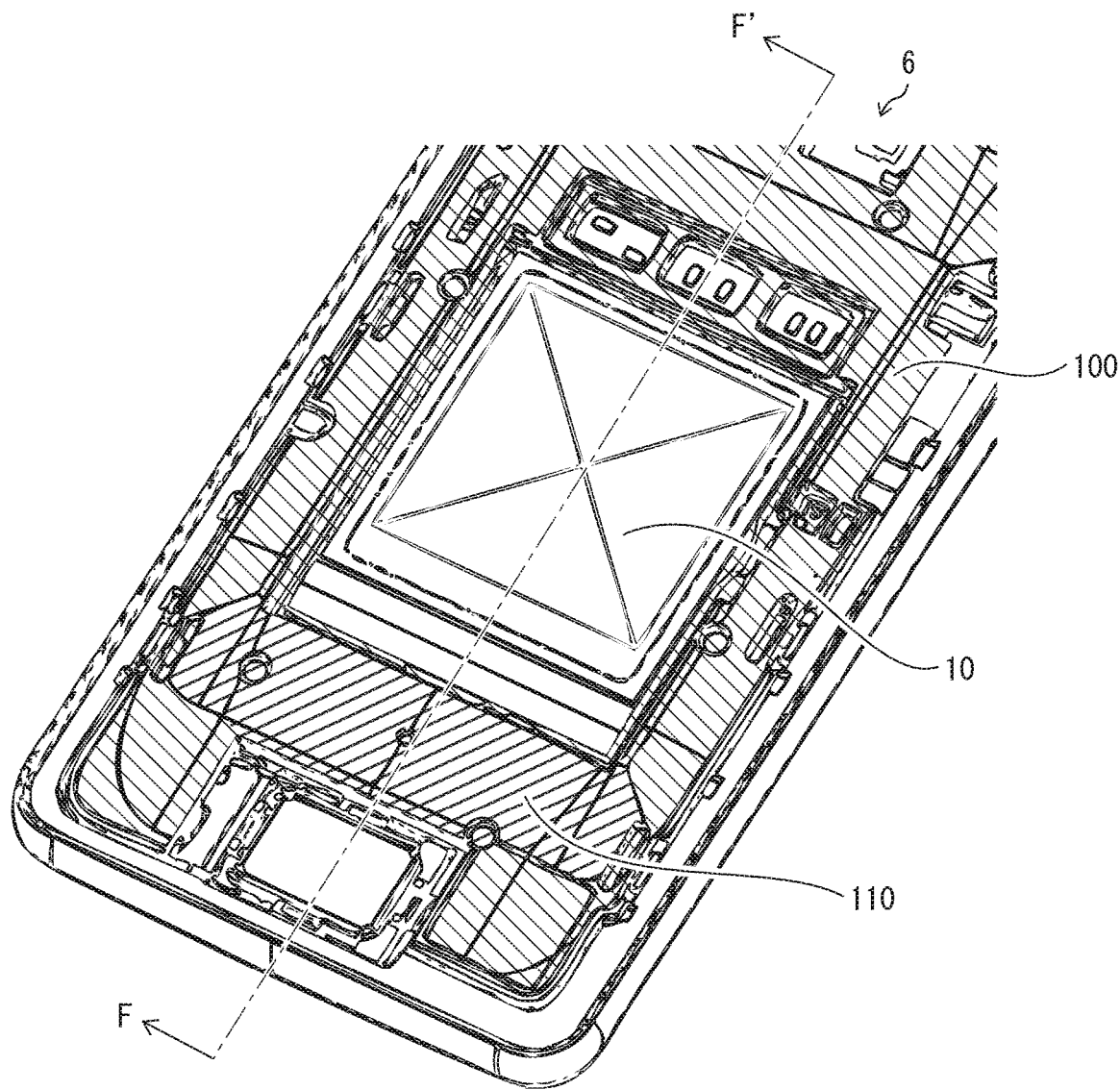
FIG. 15 is a perspective view illustrating the internal structure of an electronic device according to the fourth embodiment.
Figure 16A:
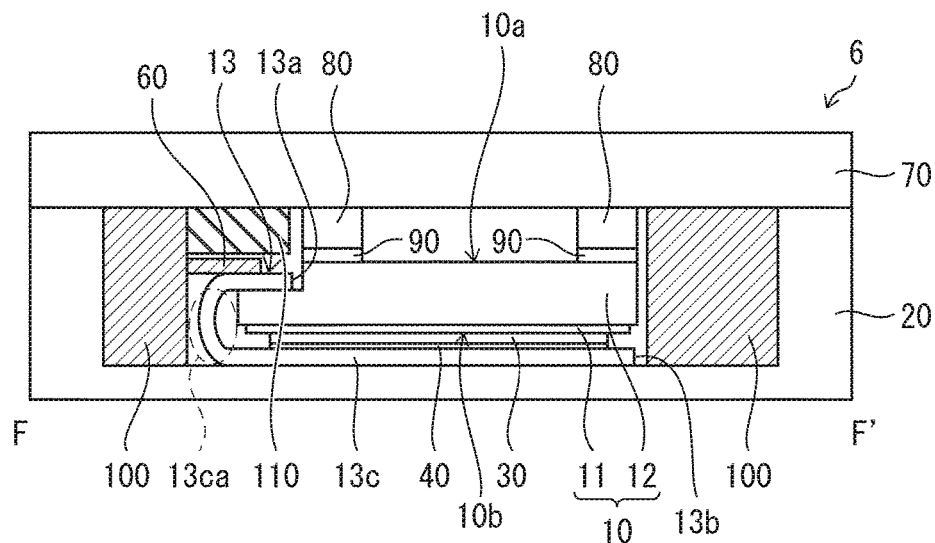
FIG. 16A is a sectional view taken along line F-F' in FIG. 15 of the electronic device according to the fourth embodiment in a state in which the cover illustrated in FIG. 11 is attached.
Figure 16B:
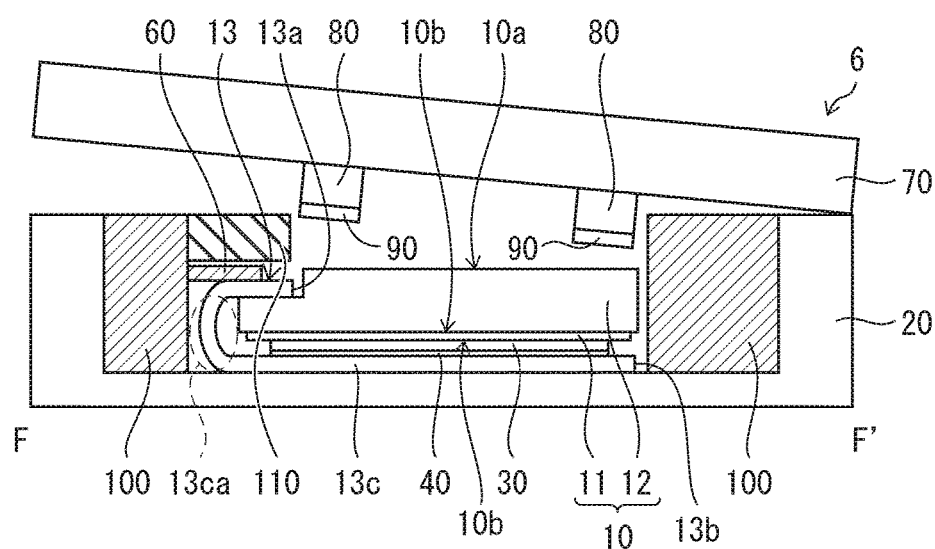
FIG. 16B is a sectional view illustrating a state in which the cover is being removed in the electronic device illustrated in FIG. 16A.
Figure 17:
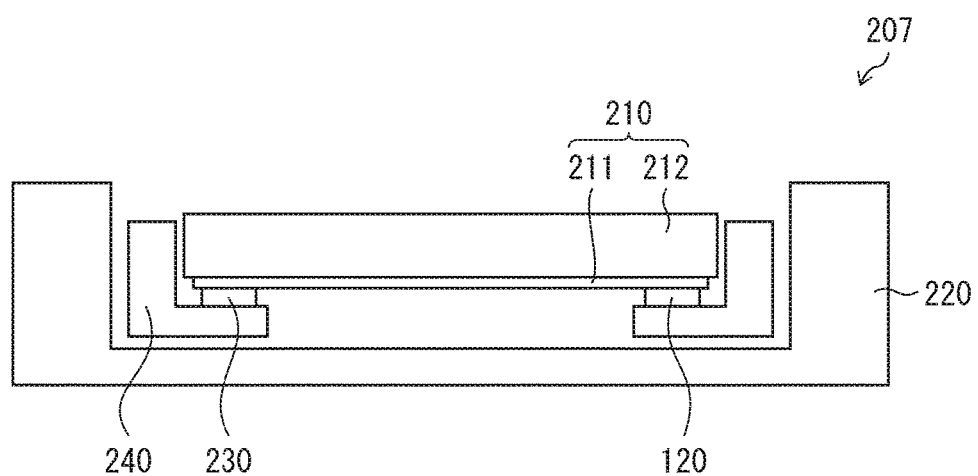
FIG. 17 is a sectional view illustrating a structure in which a display panel is attached to a housing by using a holder in an existing electronic device.
Figure 18A:
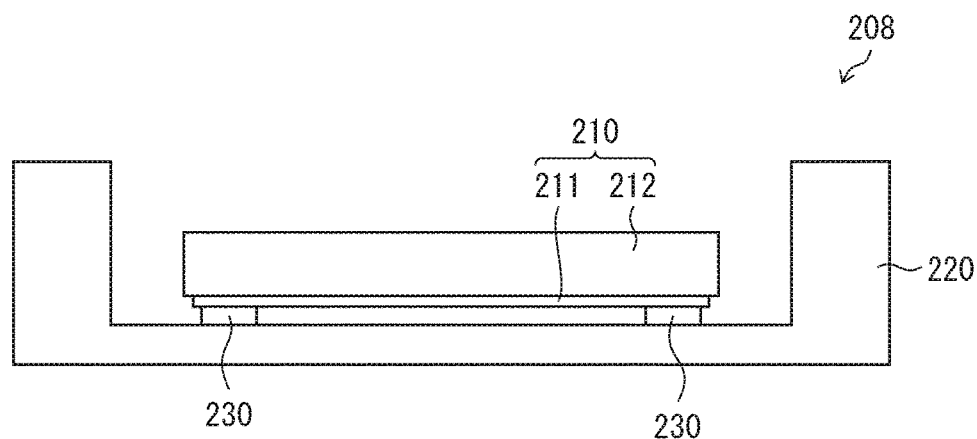
FIG. 18A is a sectional view illustrating a structure in which a display panel is attached to a housing by using an adhesive tape in an existing electronic device.
Figure 18B:
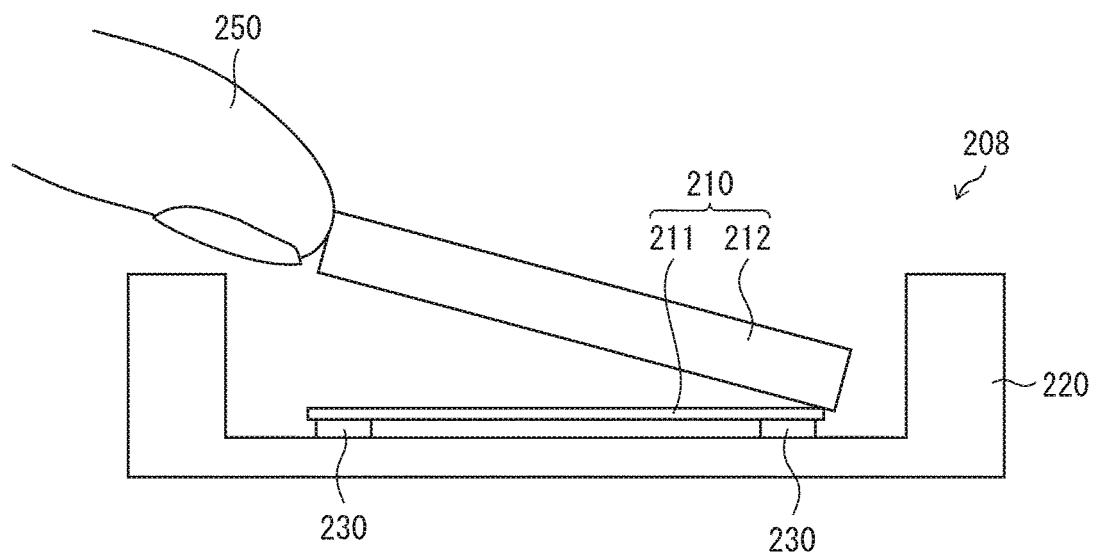
FIG. 18B illustrates a state in which the display panel illustrated in FIG. 18A is being removed.

FIG. 15 is a perspective view illustrating the internal structure of an electronic device 6 according to the fourth embodiment. FIG. 16A is a sectional view taken along line F-F' in FIG. 15 of the electronic device 6 according to the fourth embodiment in a state in which the cover 70 illustrated in FIG. 11 is attached. FIG. 16B is a sectional view illustrating a state in which the cover 70 is being removed in the electronic device 6 illustrated in FIG. 16A. The electronic device 6 has the same structure as the electronic device 5 (FIGS. 13, 14A, and 14B) and further includes a rise-suppressing restraining portion 110.

As illustrated in FIGS. 15 and 16A, the rise-suppressing restraining portion 110 is disposed in the housing 20 and holds a display panel 10 in the housing by latching an edge of the display panel 10. That is, the rise-suppressing restraining portion 110 is disposed in the housing 20 so as to overlap at least a part of the frame region of the display panel 10. For example, both ends of the rise-suppressing restraining portion 110 are connected to an inner holder 100, and covers a side of the display panel 10 to which a FPC 13 is connected and the rise-suppressing member 60.

Therefore, as illustrated in FIG. 16B, when a user removes the cover 70, which is attached to the housing 20, from the housing 20, the edge of the display panel 10 is latched to the rise-suppressing restraining portion 110 via the FPC 13 and the rise-suppressing member 60. Thus, a third adhesive sheet 90, which is disposed on the cover 70, is removed from the display panel 10, and the display panel 10 can be retained on the housing 20 side. As a result, breakage of the FPC 13, which may occur due to rise of the display panel 10, can be suppressed. The rise-suppressing restraining portion 110 may be integrally formed with the inner holder 100 or may be formed as an independent member.

The present disclosure is not limited to the embodiments described above and may be modified in various ways within the scope described in the claims. The scope of the present includes embodiments that can be obtained by appropriately combining technical units disclosed in different embodiments. Moreover, a new technical feature may be formed by combining technical units disclosed in the embodiments.

The present disclosure contains subject matter related to that disclosed in Japanese Priority Patent Application JP 2018-208818 filed in the Japan Patent Office on Nov. 6, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising: a housing; a display panel attached to an inner surface of the housing; the display panel includes a liquid crystal panel and a first side of a film is disposed on a back surface of the liquid crystal panel and a first adhesive sheet is directly affixed a second side of the film opposite to the first side; and a first side of a second adhesive sheet directly affixed to the first adhesive sheet opposite to the film and a second side of the second adhesive sheet directly affixed to the inner surface of the housing, wherein a first adhesion of the first adhesive sheet to the film is weaker than a second adhesion of the second adhesive sheet to the inner surface of the housing.

2. The electronic device according to claim 1, wherein the first adhesive sheet includes
   an affixing region to which the display panel is affixed, and
   a removal tab that extends from the affixing region toward an outside of the display panel.

3. The electronic device according to claim 1, further comprising
   a flexible substrate including
      a first end portion that is connected to one side of the display panel, and
      an extension portion that extends from the first end portion toward an outside of the display panel, that is further folded back at a folded portion, and that passes between the first adhesive sheet and the housing.

4. The electronic device according to claim 3, further comprising:
   a rise-suppressing member that is disposed so as to face the housing in a state in which the flexible substrate is interposed between the rise-suppressing member and the housing,
   wherein the rise-suppressing member presses a region of the extension portion of the flexible substrate between the first end portion and the folded portion by contacting the region.

5. The electronic device according to claim 1, further comprising:
   a cover that is fitted into the housing and forms a pair with the housing to cover the display panel;
   a cushion member that is affixed to the cover and that has a shape that overlaps a frame region that surrounds an image display region of the display panel; and
   a third adhesive sheet that affixes the cushion member and the display panel to each other.

6. The electronic device according to claim 5, further comprising:
   a rise-suppressing restraining portion that is disposed in the housing and that retains the display panel in the housing by latching an edge of the display panel.

* * * * *